D. C. ANDERSON.
STUMP EXTERMINATOR.
APPLICATION FILED MAY 8, 1911.
1,012,962.
Patented Dec. 26, 1911.
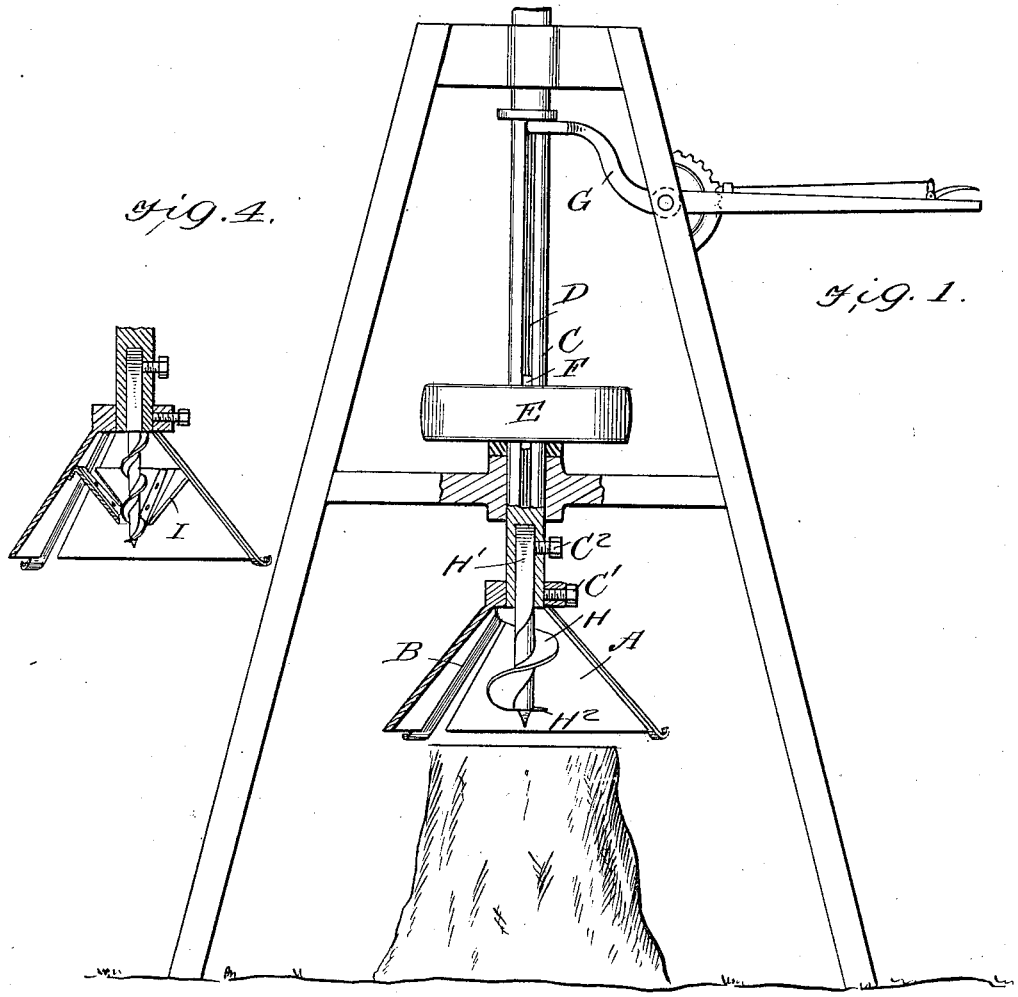
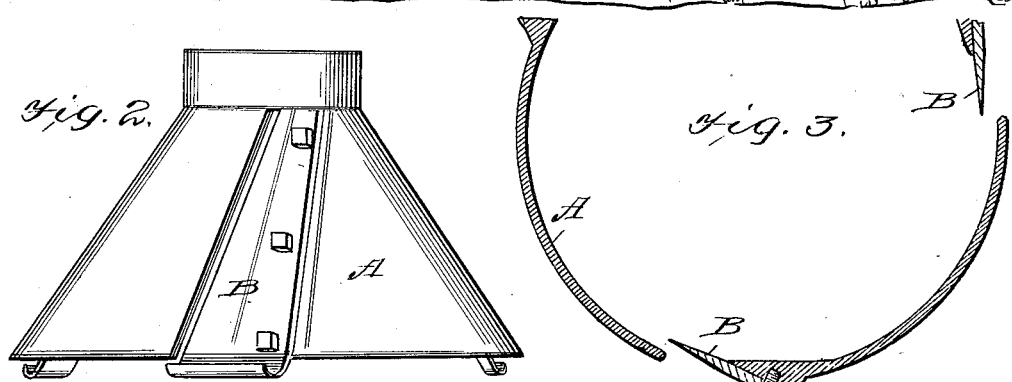
WITNESSES
INVENTOR
DAVIS C. ANDERSON
BY
ATTORNEYS

UNITED STATES PATENT OFFICE.

DAVIS CLARENCE ANDERSON, OF LA PRAIRIE, MINNESOTA.

STUMP-EXTERMINATOR.

1,012,962. Specification of Letters Patent. Patented Dec. 26, 1911.

Application filed May 8, 1911. Serial No. 625,908.

*To all whom it may concern:*

Be it known that I, DAVIS C. ANDERSON, a citizen of the United States, and a resident of La Prairie, in the county of Itasca and State of Minnesota, have invented certain new and useful Improvements in Stump-Exterminators, of which the following is a specification.

This invention is an improvement in means for exterminating stumps and has for an object to provide a novel construction whereby the inside and the outside of the stump may be acted on at the same time in order to cut away the stump and thereby destroy the same; and the invention consists in certain novel constructions and combinations of parts as will be hereinafter described and claimed.

In the drawing Figure 1 is a side elevation, partly in section, of an apparatus embodying my invention. Fig. 2 is a side view of the cutter head. Fig. 3 is a transverse section of the cutter head, partly broken away. Fig. 4 shows a cutter head having both inner and outer knives.

By my invention I seek to provide a novel construction for exterminating stumps by reducing them to shavings.

In the construction shown in Fig. 1, I employ a cutter head having a cone A flaring outwardly toward its lower end and provided with a number of knives B which may be three or more in number and which preferably are arranged with their lower ends slightly in advance, thus making a draw feed as will be understood from Fig. 2. This cone is fixed on a shaft C having a key-way D and a pulley E, with a key F operating the key-way D, a lever G being provided for raising and lowering the shaft C and the cutter head carried thereby. The cutter head A may be secured to the shaft C by a set-screw C' and a set-screw C² secures the shank H' of the auger H, which auger H may have a single lip H² and is disposed centrally of the cone A and as shown hereinafter slightly above the lower edge of the cone.

It will be noticed that the diameter of the spiral of the auger H is equal to or slightly exceeds the small end of the cone A so that the auger will cut away all of the central portion of the stump, while the knives B will cut the outer side of the cone to the central opening or bore formed by the auger.

In operation, motion may be given the shaft C by a belt applied to the pulley and driven from any suitable source of power.

In Fig. 4, I show a somewhat different form of cutter head. In this, the outer cutters are carried by a cone as in Fig. 1, but the inner cutters are in the form of blades I arranged at an incline to the axis of the cutter head and converging at their lower ends and extending at their upper outer ends to a point adjacent to the upper ends of the outer blades so that the inner blades I will cut away the intermediate portion of the stump and the outer blades will cut away the outer portion of the stump as the operation proceeds.

It is preferable to extend the outer cutters down below the cutter head and to return or turn said cutters up slightly at their lower ends in order that they may cut away any obstruction that may extend outwardly from the body of the stumps, such as roots or the like to permit the cutter head to continue down in the ground in cutting away the stump. By this arrangement, the outer cutters cut a trifle wider than the width of the cutter head as will be understood from Figs. 1, 2 and 4 of the drawing.

I claim:

1. An apparatus for use in destroying stumps comprising a cutter head having an outer cone or casing diverging toward its lower end and provided at intervals with blades or cutters, set slightly in advance at their lower ends and an intermediate cutter of a width laterally which at least equals the diameter of the circle traversed by the upper ends of the blades of the cone in the revolution of the head, substantially as and for the purposes set forth.

2. An apparatus for use in exterminating stumps comprising a cutter head having a cone provided at intervals with blades, and inner cutters in the form of blades converging toward their inner ends and arranged and operating substantially as and for the purposes set forth.

3. An apparatus, substantially as described, comprising a cutter head having outer knives whose lower ends are curved outwardly and upwardly and a cutter disposed centrally within the head, substantially as set forth.

DAVIS CLARENCE ANDERSON.

Witnesses:
JOHN F. HYNES,
W. H. HASSING.

Copies of this patent may be obtained for five cents each, by addressing the "Commissioner of Patents, Washington, D. C."